C. F. WALLER.
CHURN.
APPLICATION FILED MAR. 12, 1917.

1,250,396.

Patented Dec. 18, 1917.
2 SHEETS—SHEET 1.

WITNESSES
Chas. E. Hempel.
H. N. Babcock.

INVENTOR
Charles F. Waller.
BY Richard B. Owen,
ATTORNEY

C. F. WALLER.
CHURN.
APPLICATION FILED MAR. 12, 1917.
1,250,396.
Patented Dec. 18, 1917.
2 SHEETS—SHEET 2.
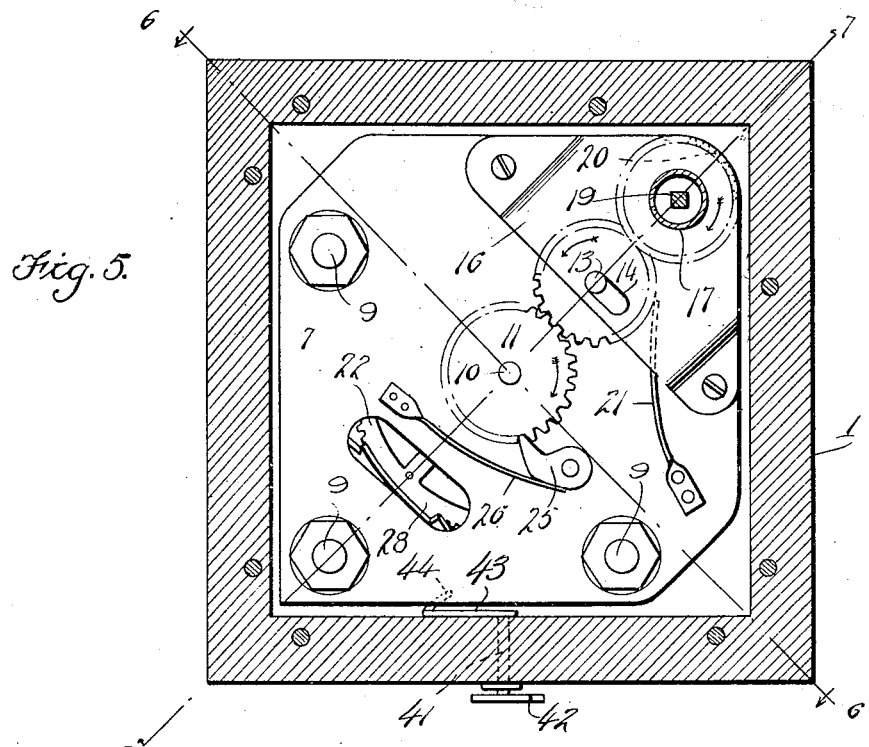
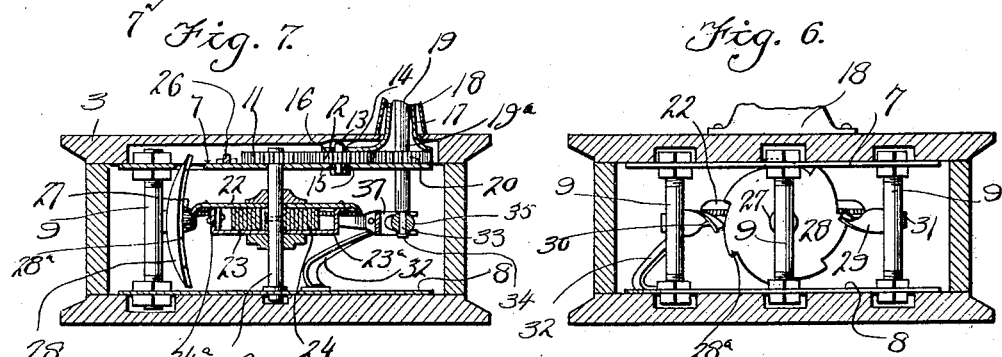
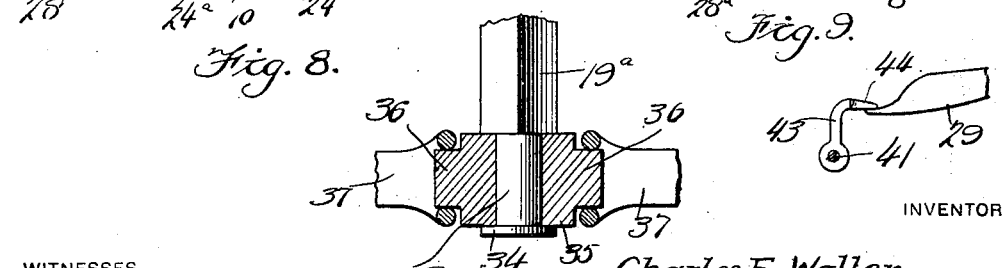
WITNESSES
INVENTOR
Charles F. Waller.
BY
ATTORNEY

UNITED STATES PATENT OFFICE.

CHARLES FLOYD WALLER, OF SALMON, TEXAS.

CHURN.

1,250,396.　　　　Specification of Letters Patent.　　Patented Dec. 18, 1917.

Application filed March 12, 1917. Serial No. 154,272.

*To all whom it may concern:*

Be it known that I, CHARLES FLOYD WALLER, a citizen of the United States, residing at Salmon, in the county of Anderson and State of Texas, have invented certain new and useful Improvements in Churns, of which the following is a specification.

This invention relates to churns, and more particularly to a churn provided with an actuating motor contained within a casing which forms a support for the cream container.

One of the main objects of the invention is to provide a churn of the character stated of simple construction and operation having a vertically reciprocable operating rod provided with means for attaching said rod to the usual churn dasher. A further object is to provide a spring motor for reciprocating the operating rod, and means for winding the actuating spring of the motor by rotating the operating rod. A further object is to provide actuating means between the motor spring and the operating rod for winding purposes adapted to permit rotation of the rod in either direction so as to bring it in proper position to be secured to the dasher rod of the churn. Further objects will appear from the detail description.

In the drawings:—

Fig. 5 is a top plan view of the motor, the top of the casing being removed,

Fig. 6 is a section taken substantially on line 6—6 of Fig. 5,

Fig. 7 is a section taken substantially on line 7—7 of Fig. 5,

Fig. 8 is a fragmentary sectional view of the connections between the operating rod and the yoke, Fig. 9 is a detail of the means for locking the motor against operation.

Figure 1:
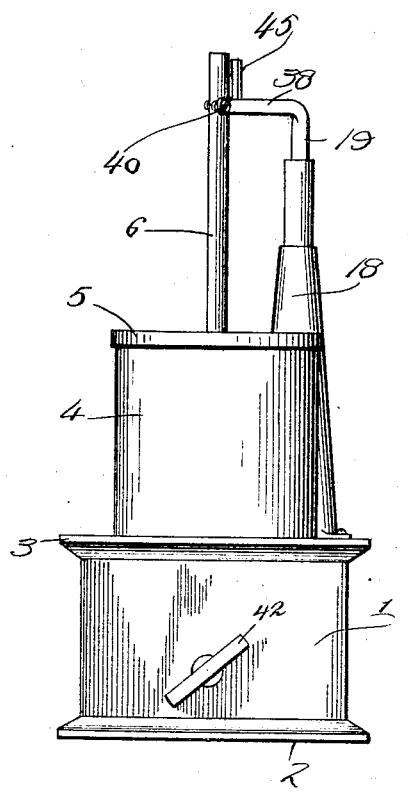
Figure 1 is a side view of a churn constructed in accordance with my invention.
Figure 2:
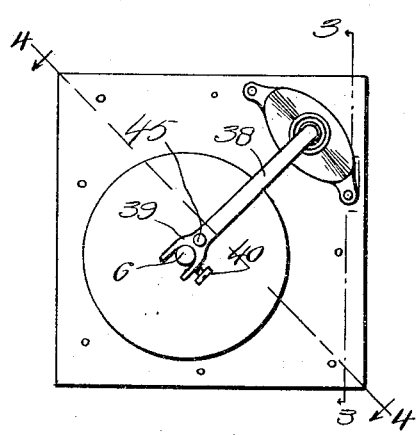
Fig. 2 is a top plan view of the same.
Figure 3:
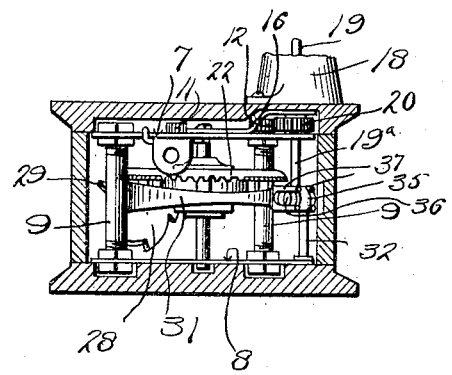
Fig. 3 is a section taken substantially on line 3—3 of Fig. 2.
Figure 4:
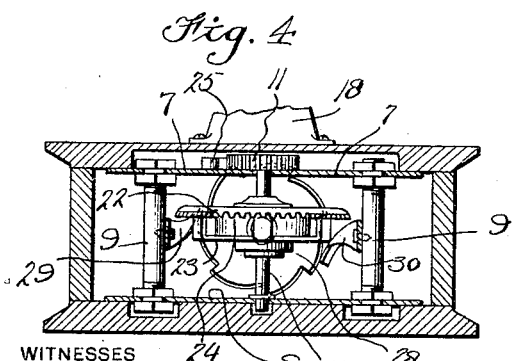
Fig. 4 is a section taken on line 4—4 of Fig. 2.

The casing 1 is provided with the supporting base 2 and a removable cover 3. This casing contains the actuating motor for the operating rod of the churn and is adapted to act as a support for the jar or container 4 in which the cream to be churned is placed. This jar is provided with a removable cover 5 provided with a central opening to permit reciprocation of the dasher rod 6 which is detachably secured to the operating rod.

The frame plates of the motor, 7 and 8, are secured in spaced relation by the spacing posts 9. A vertically disposed, centrally located arbor or shaft 10 is rotatably mounted in the plates, and gear 11 is keyed on the upper end of shaft 10, and rests on the upper face of top plate 7. This gear meshes with a gear 12 which is provided with a stub shaft 13 which extends above and below the gear and is mounted in the alined slots 14 and 15 in the triangular plate 16 secured to the top plate 7 in spaced relation thereto, and the top plate 7, respectively. The triangular plate 16 is provided, adjacent its apex, with an integral upwardly extending sleeve 17 which extends upward in a sleeve 18 carried by the cover 3 of casing 1. An operating rod 19 is mounted in sleeve 17 for vertical reciprocation. The lower portion of this rod is of square or polygonal cross section, as at $19^a$, and is inserted through a corresponding bore through a winding pinion 20 mounted on the upper face of frame plate 7. Pinion 20 meshes with the winding gear 12 so that, by rotating the operating rod 19 in a clockwise direction rotation will be imparted to the shaft 10 in a similar direction through the pinion 20, winding gear 12, and gear 11. When the operating rod is rotated in this manner, the direction of rotation will be such as to hold the projecting ends of the stud 13 of winding gear 12 tightly against the inner ends of the alined slots 14 and 15, thus holding all of the winding gears in proper mesh. When it is desired to rotate the operating rod in the opposite direction so as to bring it in proper position to be secured to the dasher rod of the churn, this reverse rotation will force the winding gear 12 outward out of mesh with pinion 20, the slots permitting this outward give of the gear against the action of the leaf spring 21 which is secured to the top plate 7 and normally extends closely adjacent the periphery of gear 12. As soon as this reverse rotation of the operating rod is stopped, the gear 12 will be returned to its normal position by spring 21 so that, by turning the operating rod in the manner first described, the shaft 10 will be rotated.

A drive gear 22 is mounted on shaft 10 so as to be rotatable independently thereof.

A spider 23 is similarly mounted on shaft 10 below gear 22, and has its arms 23ª fixedly secured to the gear. This spider constitutes a housing in which is mounted a spiral actuating spring 24. The inner end of this spring is secured to the shaft 10, and the outer end is secured to one of the arms 23ª, as at 24ª. By this means, when the shaft 10 is rotated, the spring 24 will be wound so as to cause rotation of gear 22. To secure the actuating spring in wound or operative position, dog 25 is mounted on the top plate 7 of the motor casing and is normally held inward in engagement with the teeth of gear 11 by a leaf spring 26. This dog serves to prevent reverse rotation of the spring so that the energy of the spring will tend to rotate the drive gear 22.

Gear 22 meshes with a pinion 27 carried by a toothed concavo-convex escapement wheel 28 rotatably mounted on a stub shaft extending inward from one of the frame posts 9. When the gear 22 is rotated, the escapement wheel 28 will be rotated by means of the pinion 27. The teeth 28ª of escapement wheel 28 are equally spaced and similarly directed. These teeth are adapted to engage the oppositely directed fingers 29 and 30 formed at the opposite ends of an actuating yoke 31 which is rockably supported between the two other frame posts 9. As will be noted from Fig. 6 of the drawings, the fingers 29 and 30 are positioned on opposite sides of the axis of rotation of escapement wheel 28, the finger 29 being directed upward and the finger 30 downward. As the wheel 28 is rotated, the teeth 28ª will engage the finger 29 so as to raise it thus rocking the yoke 31 downward. Subsequent to their engagement with the fingers 29, the teeth 28ª will engage the finger 30 so as to force it downward thus rocking the yoke upward, in this manner the yoke will be rocked about its pivotal axis when the wheel 28 is rotated by means of the drive gear 22. To facilitate this operation of the yoke, a leaf spring 32 is secured to the base plate 8 of the motor frame and is turned over with its upper end pressing against the under face of the yoke. This spring tends to normally force the yoke upward and is of material assistance in the operation of the yoke.

When the yoke is reciprocated the operating rod 19 and dasher rod 6 will also be reciprocated, as will be evident. The downward movement of rod 19, and the forward end of the yoke to which this rod is secured, will be accelerated by the weight of the dasher and its rod, and the rod 19, while the upward movement of the forward end of the yoke will be retarded by the weight of these elements. The spring 32 tends to raise the forward end of the yoke so as to overcome, to a certain extent, the downward pressure exerted by the dasher rod and the operating rod thus serving to balance the yokes so as to insure ease of operation thereof. This spring also provides a cushion member for the yoke on its downward movement thus eliminating all unnecessary vibration.

The lower portion of operating rod 19 is reduced and rounded to form a cylindrical coupling member 33, the lower end of the rod being headed as at 34. This reduced portion 33 of the rod is inserted through the center of a connecting block 35 provided at each side with an outwardly directed stud 36. Each stud 36 projects between the prongs of an outwardly directed fork 37, these forks being secured to the yoke at the approximate center thereof, in spaced relation. By this means the operating rod is connected to the yoke so as to be reciprocated vertically when the yoke is rocked, and the connecting member or reduced portion 33 of the operating rod provides a pivotal connection between the same and the block 35 which permits rotation of the rod in either direction.

At its upper end, the rod 19 is turned downward at right angles to form a horizontally disposed integral arm 38. This arm is provided, at its outer end, with a fork 39 through one prong of which is threaded a set screw 40. This fork is adapted to receive the dasher rod 6 of the churn and is of such depth, and the set screw is so positioned, that when the set screw is threaded inward into operative position it will be in advance of the axis of rod 6 so as to tend to force the rod inward into the fork, the set screw also acting to secure the rod to arm 38. By this means, when the operating rod 19 is reciprocated, the dasher of the churn will be similarly operated so as to agitate or churn the contents of container 4.

A rod 41 is rotatably mounted through one side of casing 1 and is provided on its outer end with an operating head or handle 42. A hook locking member 43 is secured on the inner end of this rod with its hook end turned inward as at 44. When the motor is in proper position within the casing 1, locking member 43 extends inward so that, by turning the rod 41, the hook portion 44 of this member will engage over operating finger 29 of yoke 31. By this means, the yoke will be locked against rocking so as to render the motor inoperative. With the hook in this position, the motor may be quickly and easily wound by rotating operating rod 19 in a clockwise direction. For this purpose, a stud or finger 45 extends upward from arm 38 adjacent fork 39. By grasping this finger the operating rod may be easily rotated in either direction desired. During this operation, the container 4 is not placed upon the casing 1, thus avoiding interference of the dasher-rod 6 with the rotation of arm 38 of operating rod 19. When the motor has been completely wound, the rod may be adjusted about its axis of rotation so as to bring the fork 39 in proper position to receive the dasher rod 6 when the receptacle 4 is positioned at the approximate center of the top of casing 1. Due to the fact that one of the gears of the train of winding gears is mounted for movement into an inoperative position when the operating rod is rotated anti-clockwise, this adjustment of the arm 38 may be quickly and easily accomplished after the motor has been wound, after the dasher rod 6 of the churn has been connected to arm 38 in the manner described, the locking member 43 may be turned so as to release the yoke thus permitting operation of the motor so as to reciprocate rod 6 in the manner above described.

By my invention I have provided a motor for churning and similar purposes of very simple construction and operation which may be quickly and easily wound without the employment of a key or similar instrument, the operating rod of which may be easily adjusted in either direction about its axis of rotation so as to permit the connection of the motor to the dasher rod of a churn. It will be evident that there may be slight changes made in the construction and arrangement of the different parts of my invention without departing from the field and scope of the same, and I intend to include all such changes, as fall within the scope of the appended claims, in this application in which a preferred form only of my invention is disclosed.

What I claim is:—

1. In churns, the combination of a reciprocable and rotatable operating rod, a spring actuated motor, connections between said motor and rod for reciprocating said rod, and means for winding the actuating spring of said motor when the operating rod is rotated in one direction.

2. In churns, the combination of a reciprocable rotatably mounted rod, a spring actuated motor, connections between the motor and the rod for reciprocating said rod, connections between the actuating spring of said motor and the rod for winding said spring by rotation of the rod in one direction, said last named connections being adapted to permit free rotation of the rod in the other direction.

3. In churns, the combination of a reciprocable rotatably mounted rod, a rockably mounted yoke, connections between said rod and yoke for reciprocating the rod when the yoke is rocked, a rotatable shaft, a drive gear mounted on said shaft for independent rotation, an actuating spring mounted about the shaft with one end secured thereto and its other end secured to said drive gear, connections between the yoke and drive gear for rocking said yoke, and connections between the rod and shaft for rotating said shaft so as to wind the spring when said rod is rotated in one direction.

4. In churns, the combination of a shaft mounted for free rotation in one direction, a drive gear mounted on said shaft for independent rotation, an actuating spring mounted about the shaft and having one end secured thereto and its other end secured to said gear, a rockably mounted yoke, connections between the yoke and said drive gear for rocking the yoke, a reciprocable operating rod having one end loosely connected to said yoke so as to permit rotation of said rod in either direction, and connections between said rod and shaft for causing rotation of said shaft when the rod is rotated in one direction adapted to permit free rotation of said rod in the other direction.

5. In churns, the combination of a shaft mounted for free rotation in one direction, a drive gear mounted on said shaft for independent rotation, an actuating spring mounted about the shaft and having one end secured thereto and its other end secured to said gear, a rockably mounted yoke, connections between the yoke and said drive gear for rocking the yoke, a reciprocable operating rod having one end loosely connected to said yoke so as to permit rotation of said rod in either direction, and a train of winding gears operatively connecting said rod and shaft for causing rotation of the shaft when the rod is rotated in one direction, one of the gears of said train gear being free for movement in one direction so as to permit free rotation of the rod in the other direction.

6. In churns, the combination of a rockable shaft, a drive gear mounted on said shaft for independent rotation, an actuating spring mounted about the said shaft having one end secured thereto and the other end secured to said drive gear, a gear keyed on said shaft, a reciprocable operating rod, a winding pinion mounted on said rod and connected to the rod for rotation therewith, a winding gear intermediate said pinion and the gear keyed on said shaft and normally in mesh with said gear and pinion, a rockably mounted yoke, connections between said drive gear and yoke for operating said yoke, and connections between said yoke and rod for reciprocating the rod, the said rod being so connected to the yoke as to permit rotation of the rod in either direction about its pivotal axis.

7. In churns, the combination of a rotatable shaft, a drive gear mounted on said shaft for independent rotation, an actuating spring mounted about said shaft having one end secured thereto and the other end secured to said drive gear, a gear keyed on said shaft, a reciprocable operating rod, a winding pinion mounted on said rod and connected to the rod for rotation therewith, a winding gear intermediate the pinion and the gear keyed on said shaft and normally in mesh with said gear and pinion, the said winding gear being slidably mounted for movement in one direction out of mesh with the winding pinion whereby free rotation of the operating rod in one direction is permitted, means for normally holding said winding gear in operative position, a rockably mounted yoke operating connections between said yoke and drive gear, and connections between said yoke and rod for reciprocating the connections, said rod being adapted to permit rotation of the rod in either direction.

In testimony whereof I affix my signature in presence of two witnesses.

CHARLES FLOYD WALLER.

Witnesses:
W. R. CAMPBELL,
EUGENE WALLING.